(12) United States Patent
Casale (10) Patent No.: US 11,640,051 B1
(45) Date of Patent: May 2, 2023

(54) MOTORIZED LOUPES

(71) Applicant: Visionary Optics, LLC, Scottsdale, AZ (US)

(72) Inventor: Jack H Casale, Scottsdale, AZ (US)

(73) Assignee: Visionary Optics, LLC, Scottsdale, AZ (US)

( * ) Notice: Subject to any disclaimer, the term of this patent is extended or adjusted under 35 U.S.C. 154(b) by 0 days.

(21) Appl. No.: 17/733,052

(22) Filed: Apr. 29, 2022

Related U.S. Application Data (60) Provisional application No. 63/271,939, filed on Oct. 26, 2021.

(51) Int. Cl.
*G02B 25/00* (2006.01)
*G02C 7/08* (2006.01)

(52) U.S. Cl.
CPC ......... *G02B 25/005* (2013.01); *G02B 25/004* (2013.01); *G02C 7/088* (2013.01)

(58) Field of Classification Search
CPC ..... G02B 25/005; G02B 25/004; G02C 7/088
See application file for complete search history.

(56) References Cited

U.S. PATENT DOCUMENTS

| | | | | |
|---|---|---|---|---|
| 10,448,004 B1* | 10/2019 | Shau | ................ | G02B 27/0172 |
| 2014/0218646 A1* | 8/2014 | Wilt | ..................... | G02B 25/004 |
| | | | | 349/13 |
| 2018/0310384 A1* | 10/2018 | Chang | ................. | F21V 23/0471 |
| 2020/0073110 A1* | 3/2020 | Maeda | ................. | G02B 25/004 |
| 2020/0330179 A1* | 10/2020 | Ton | ....................... | G02C 7/088 |
| 2022/0091442 A1* | 3/2022 | Cao | ....................... | G02C 7/088 |

OTHER PUBLICATIONS https://www.orascoptic.com/en-us/blog/1-loupe-3-magnifications accessed Apr. 5, 2022.

* cited by examiner

*Primary Examiner* — Robert E. Tallman
(74) *Attorney, Agent, or Firm* — Etherton Law Group, LLC (57) ABSTRACT

Motorized loupes enable the user to automatically increase or decrease the magnification on demand, without touching the loupes. Each loupe has a micromotor attached to it which moves a lens in the loupe to change the magnification. The motor is battery powered and the batteries are carried in a small housing worn by the user. The housing also contains electronic circuitry that at least reads the position encoders, drives the motors, receives the user's magnification commands and charges the battery when plugged in. A cord runs from each loupe to the housing to carry power and signals. The motors are controlled wirelessly by a foot pedal or by voice so that the user does not have to touch the loupes to change the magnification. In the preferred embodiment of surgical loupes, a TTL loupe is attached to each lens in a user's eyeglasses for binocular vision.

11 Claims, 15 Drawing Sheets

MOTORIZED LOUPES

CROSS-REFERENCE TO RELATED APPLICATIONS

This application claims the benefit of co-pending U.S. Provisional Application No. 63/271939 filed Oct. 26, 2021.

FIELD OF INVENTION

This invention relates generally to loupes. This invention relates particularly to wearable motorized loupes that rotate automatically on demand, without the need to touch the loupes.

BACKGROUND

A loupe is a magnifying lens or lenses used for close-up work such as in surgery, ophthalmology, dentistry, and the jewelry and watchmaking professions. Loupes change the size of the field of vision at a given working distance. As magnification increases, field of view decreases and the objects in the field of view appear larger. Making the objects in the field of view larger increases the accuracy and precision of the work being done.

Loupes are used at a close distance from the eye, as a single handheld lens or as a pair of lenses integral with glasses worn on the head known as through-the-lens (TTL) loupes. Binocular loupes may also be attached to a headband or headpiece worn by the user. Binocular loupes give users a three-dimensional image as each eyepiece presents a slightly different image to each of the viewer's eyes and the parallax allows the visual cortex to generate an impression of depth. Binocular loupes are also known as surgical loupes.

Loupes with adjustable magnification are known in the art. Such loupes have a series of lenses typically including an eyepiece lens, a telescope lens, a prism, and a moving lens for the zoom functionality. To change the magnification, the user uses his fingers to rotate a collar or tab on the loupe, which causes the zoom lens to translate along the optical axis of the loupe. For situations that require a sterile field, the use of hands is problematic because it risks the introduction of bacteria from the lens being transferred to the gloves and then to the patient. It also risks contaminating the lenses with bacteria from bodily fluids including blood or saliva from the patient.

It would be advantageous to be able to adjust loupe magnification without having to touch the loupes.

SUMMARY OF THE INVENTION

The loupes of the present invention enable the user to automatically increase or decrease the magnification on demand, without touching a loupe. Each loupe has a micromotor attached to it which moves a lens or lenses in the loupe to change the magnification. The motor is battery powered and the batteries are carried in a small housing worn by the user. The housing also contains at least an electronic circuit that reads the position encoders, drives the motors, receives the user's magnification commands and charges the battery when plugged in. At the heart of the electronics is a microcontroller which monitors and controls the functionality according to the firmware code programmed into the microcontroller. A cord runs from each loupe to the housing to carry power and signals. The motors are controlled wirelessly by a foot pedal or by voice so that the user does not have to touch the loupes to change the magnification. In the preferred embodiment of surgical loupes, a TTL loupe is attached to each lens in a user's eyeglasses for binocular vision.

DETAILED DESCRIPTION OF THE INVENTION

Referring to FIGS. 1-4, the motorized loupes 10 of the present invention are shown attached to eyeglasses to provide binocular vision. The eyeglasses have a frame 4 with a nosepiece 2 and a right and a left temple 3 that secure the eyeglasses to the wearer's head over the wearer's ears. Right and left eyeglass lenses 5 are secured in the eyeglass frame 4.

A motorized loupe 10 is attached to each eyeglass lens 5. In some embodiments the right loupe is the mirror image of the left loupe. Alternatively the same configuration of the loupe can be attached to the right and left eyeglass lenses. Each loupe is covered by a housing 13 to protect the moving parts from debris and for a more appealing visual appearance.

The motorized loupes 10 are battery powered, which gives the wearer freedom of movement instead of being tethered in place to a wall socket. A relatively lightweight rechargeable battery such as lithium-ion polymer battery is preferred. The battery 53 is preferably in a belt pack 22, which alleviates increased weight the wearer would have to support if the batteries were attached directly to the eyeglasses or headpiece. However, as battery development evolves, it is contemplated that the batteries may be light enough and having sufficient power to be attached to the loupes.

Figure 1:
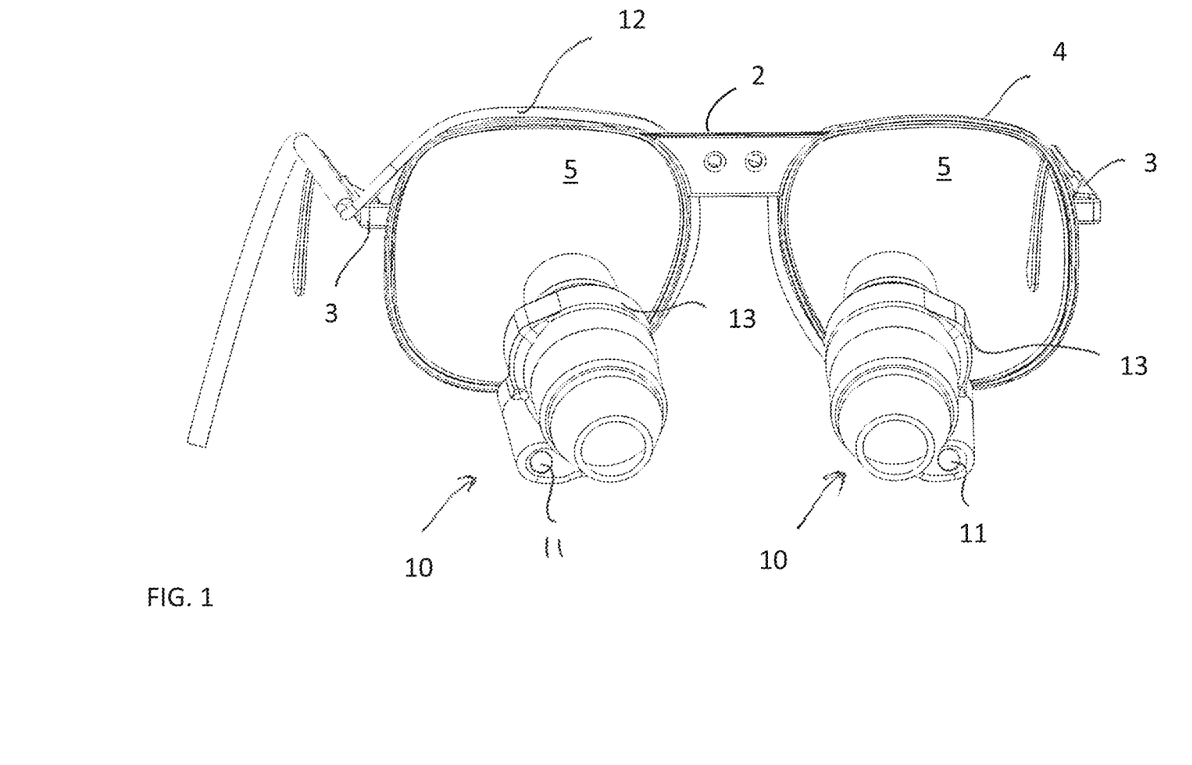
FIG. 1 is a front view of one embodiment of the present invention, with motorized loupes attached to an eyeglass frame and its eyeglass lenses.
Figure 2:
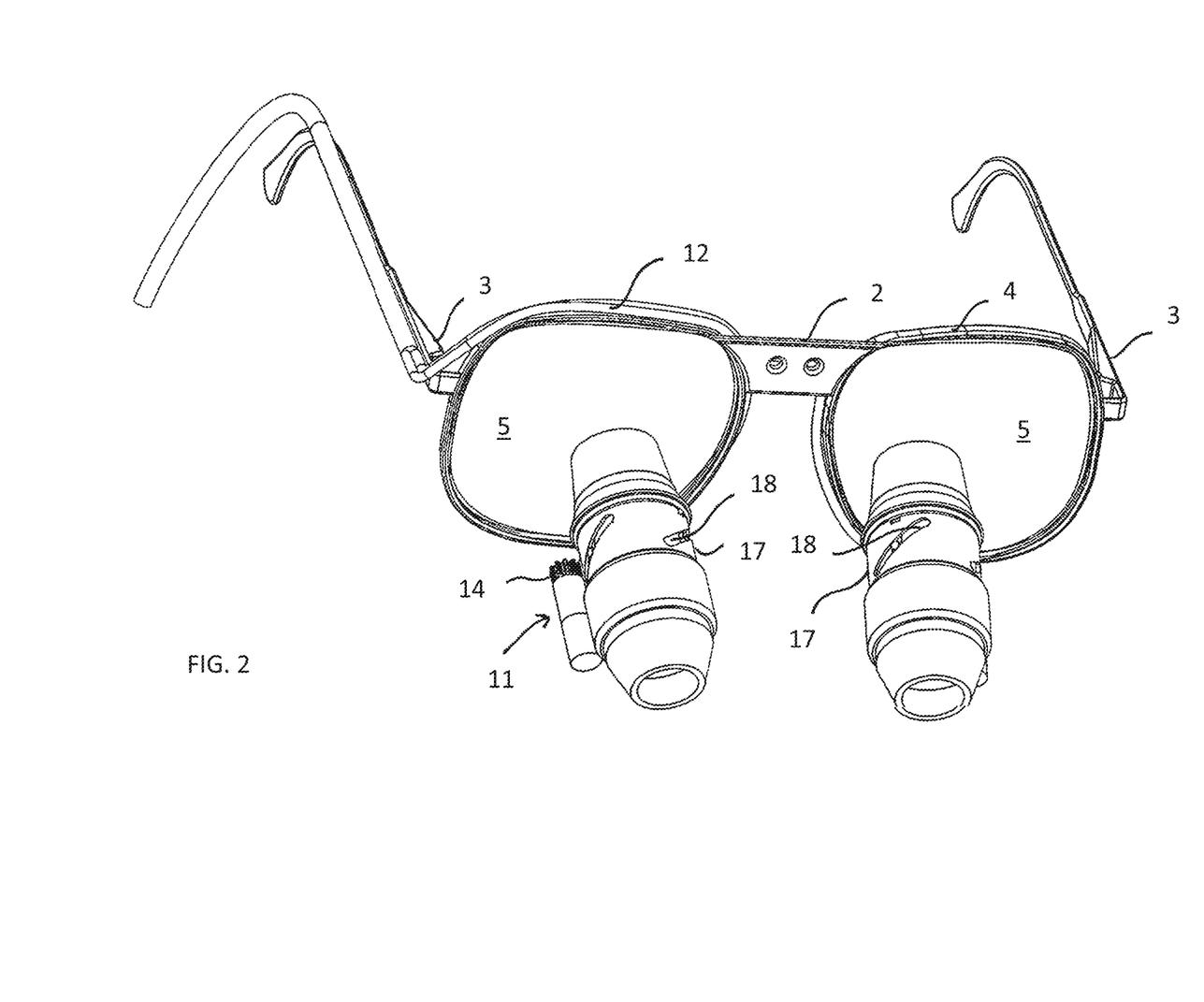
FIG. 2 shows the device of FIG. 1 without the housings around the loupes.
Figure 3:
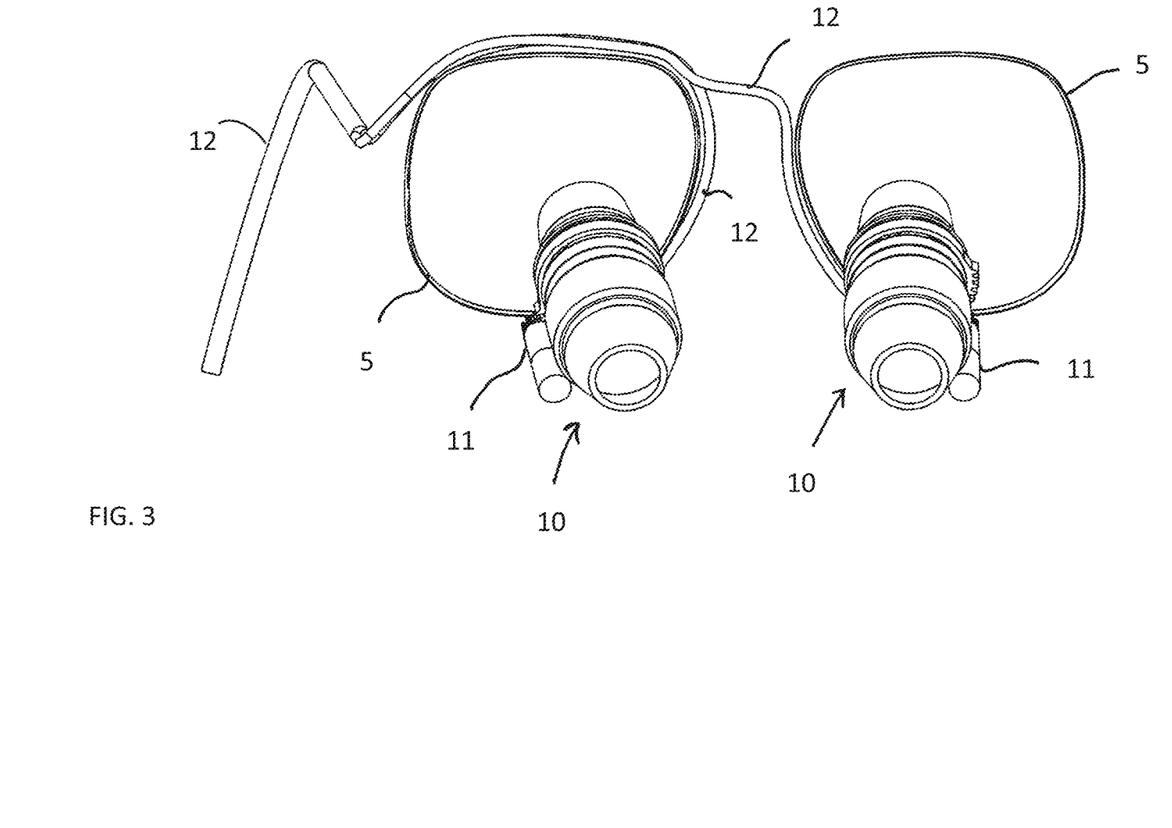
FIG. 3 shows the device of FIG. 2 without the eyeglass frame.
Figure 4:
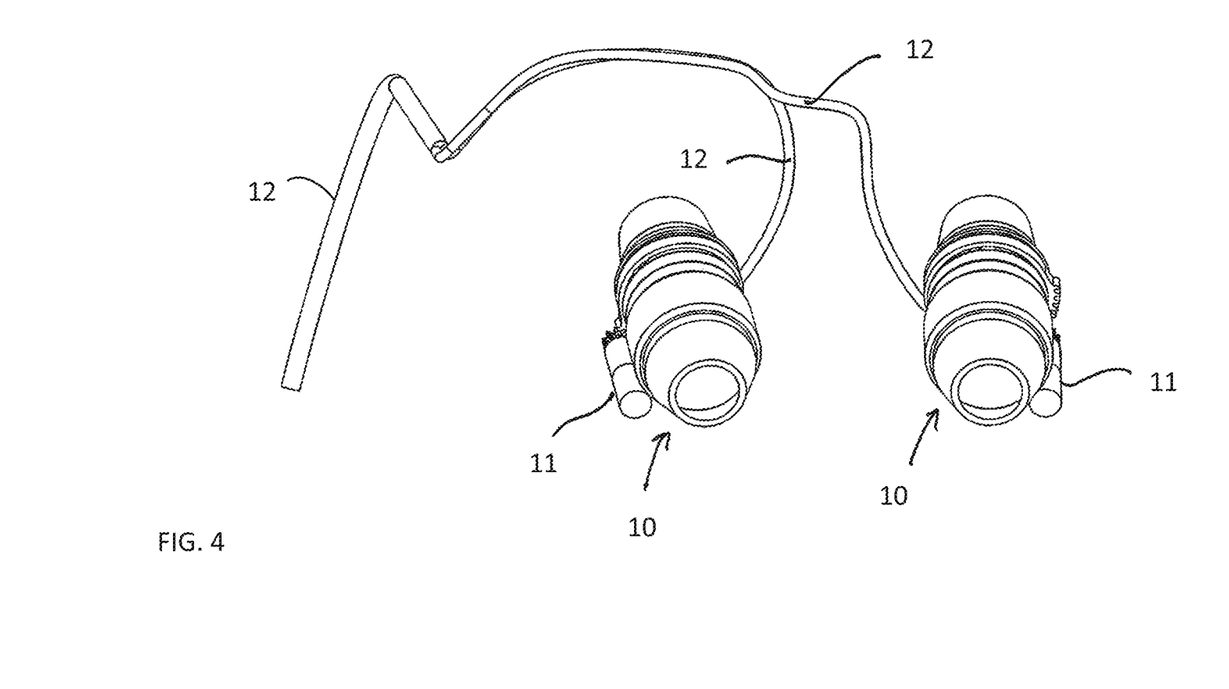
FIG. 4 shows the device of FIG. 2 without the eyeglass lenses.
Figure 5:
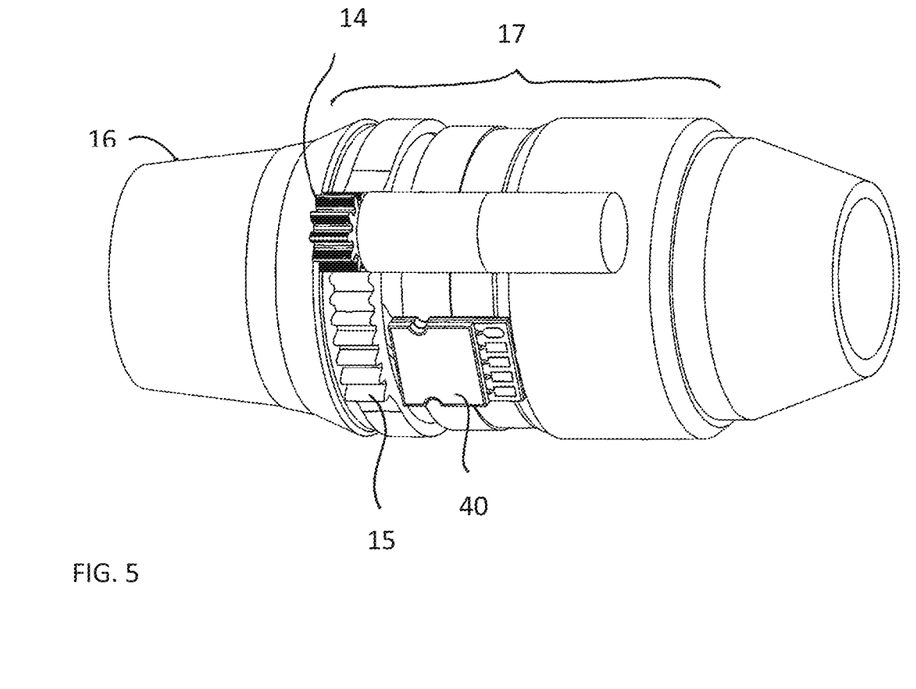
FIG. 5 is a side perspective view of one motorized loupe without the housing.
Figure 6:
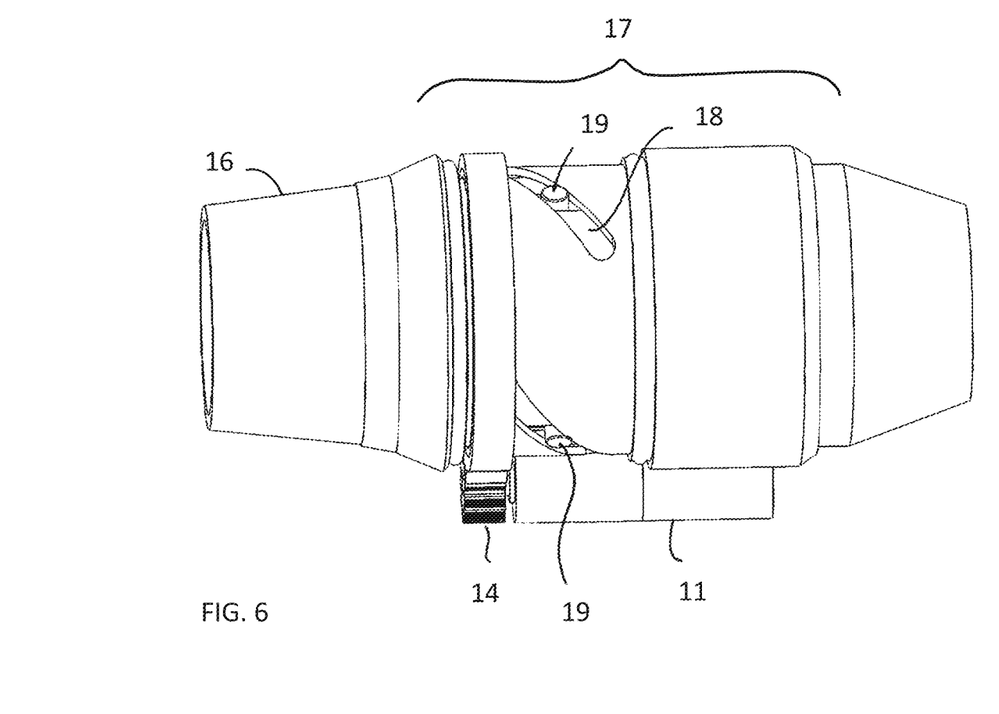
FIG. 6 is a side view of one motorized loupe without the housing.
Figure 7:
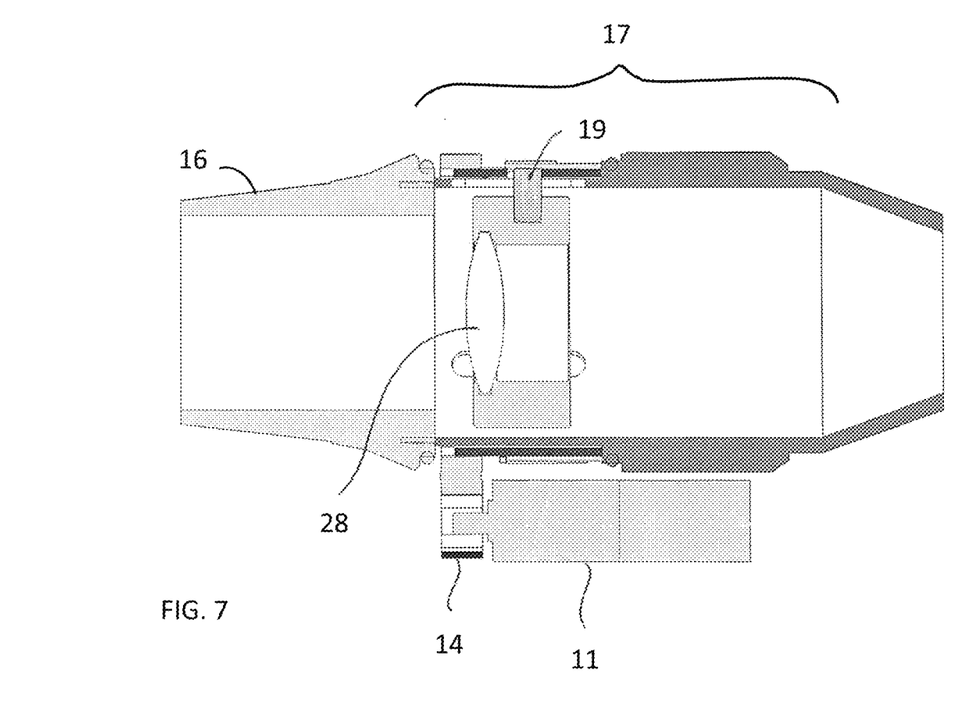
FIG. 7 is a cross-sectional view of the motorized loupe of FIG. 6.
Figure 8:
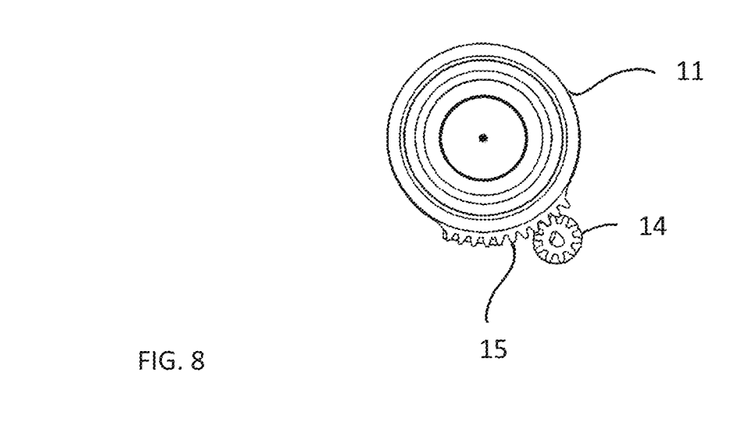
FIG. 8 is a top view of a motorized loupe of FIG. 6.
Figure 9:
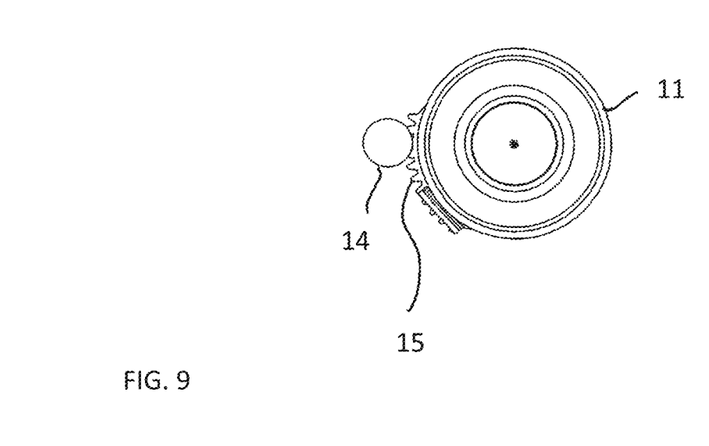
FIG. 9 is a bottom view of a motorized loupe of FIG. 6.
Figure 10:
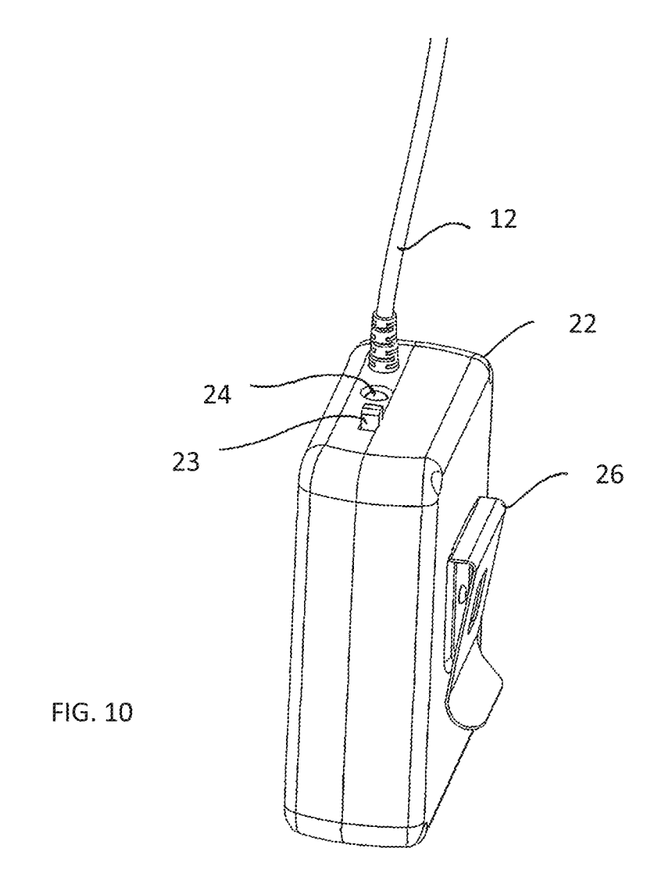
FIG. 10 is a top perspective view of the belt pack.
Figure 11:
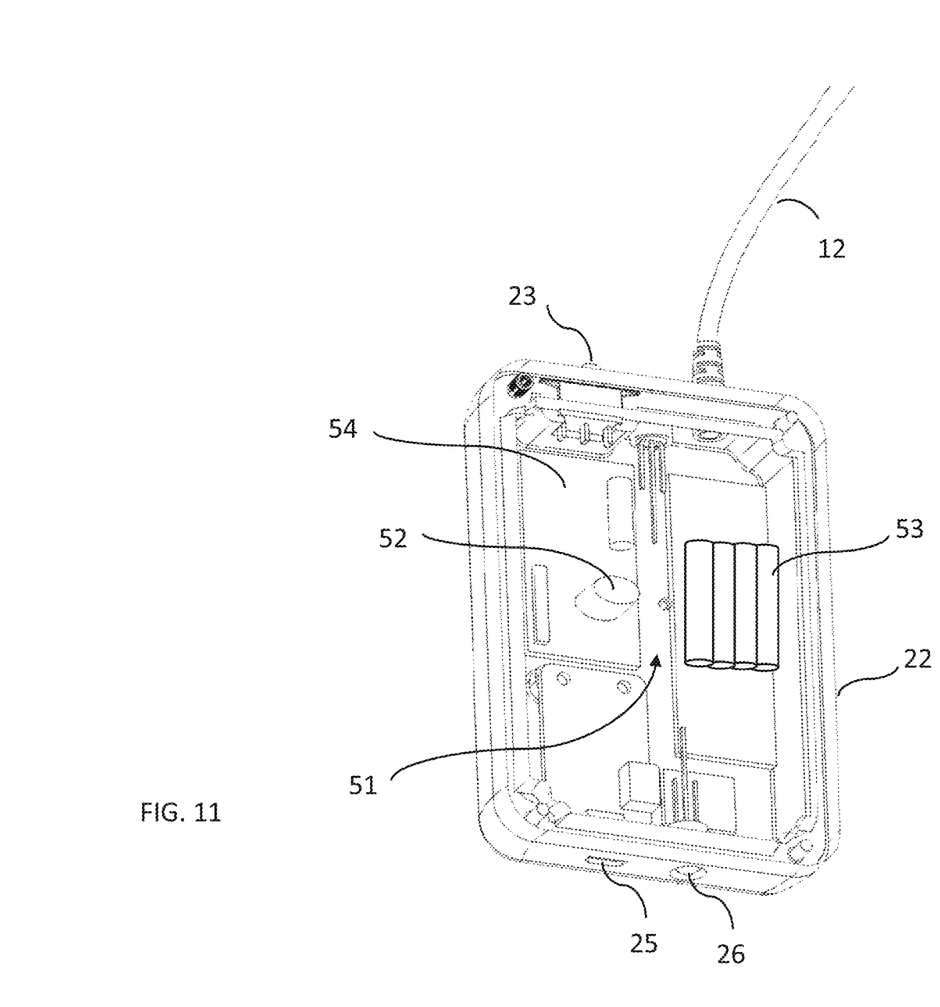
FIG. 11 is a bottom perspective view of the inside of the belt pack.
Figure 14:
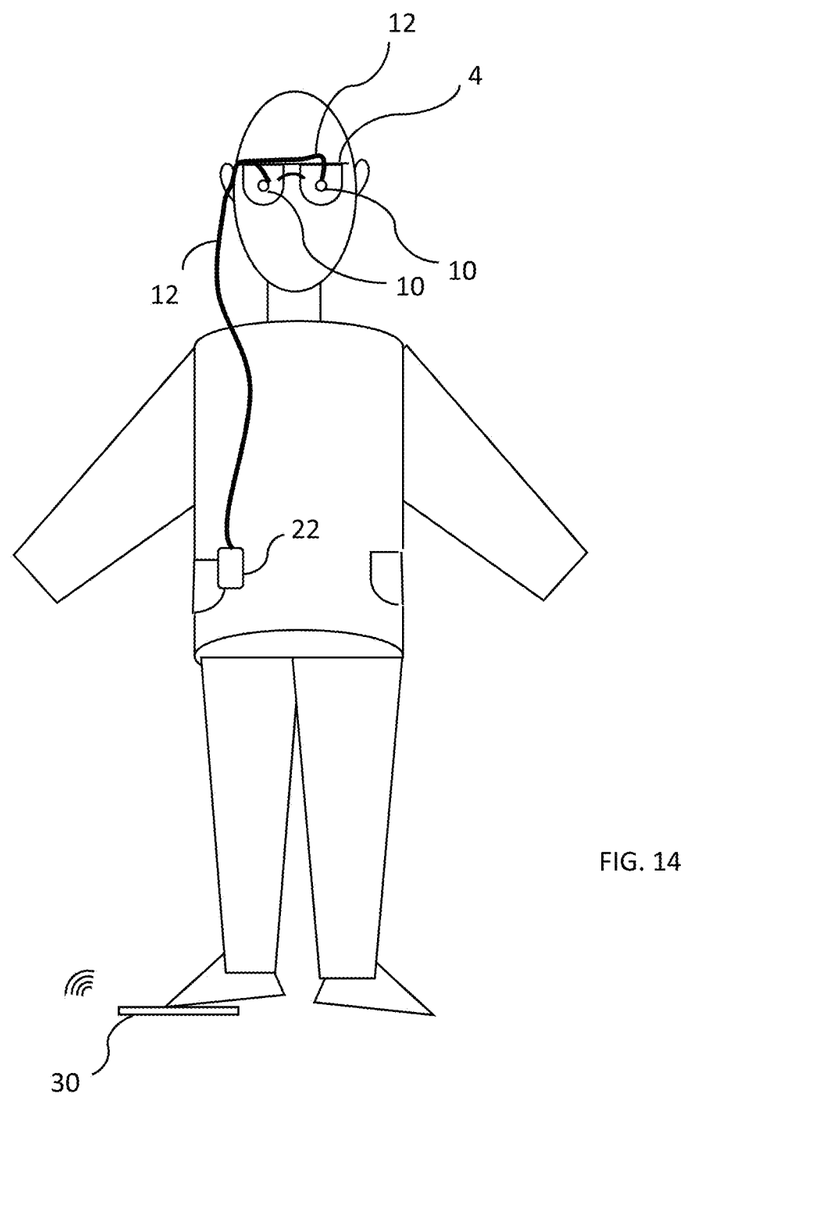
FIG. 14 illustrates a dentist wearing the device and using a foot pedal to signal the level of magnification desired.

A cord 12 connects each loupe 10 to the belt pack 22. The cord 12 preferably runs across the top of the frame 4 and along one temple 3 over or behind the user's ear to the belt pack so that the cord 12 remains out of the way while the loupes are in use. Similarly if a headpiece is used instead of eyeglasses, the cord would run from the loupes to the headpiece and over or behind the user's ear to the belt pack. The belt pack 22 is preferably worn by the user so that, as the user moves, the cord 12 remains attached to the loupes and remains out of the way. The belt pack 22 preferably has a belt clip 26 which can be hooked over the wearer's waistband, belt or pocket. FIG. 14 shows a dentist wearing the device with the belt pack 22 clipped to his pocket. The batteries may be rechargeable, in which case the belt pack also has a charging port. See FIG. 10. The belt pack 22 has a switch 23 to turn the device on and off and an LED indicator light 24 to indicate when the device is powered up and on. The belt pack 22 also has a charging port 25 and battery LED indicator light 26 to indicate whether battery is charged. See FIG. 11. The electronic circuitry 51 that controls the device is housed in the battery pack. This circuitry reads the position encoders, drives the motors, receives foot pedal commands with an RF 52 receiver and charges the battery when plugged in. At the heart of the electronics is a microcontroller 54 which monitors and controls the functionality according to the firmware code programmed into the microcontroller.

The motorized loupe 10 is shown in detail in FIGS. 5-9. Each loupe 10 has an eyepiece 16 and a cylindrical cam barrel 17 inside of which one or more lenses, referred to as the zoom lenses 28, reside. The cam barrel 17 drives pins 19 that translate the cam barrel 17 along the optical axis of the loupe 10. The cam barrel 17 has a spiral slot 18 which cooperates with the pins 19 and forces the cam barrel 17 to move along the lengthwise axis of the loupe 10 as it rotates, thus moving the zoom lenses 28 along the lengthwise axis as well. Moving the zoom lenses changes the magnification.

The cam barrel 17 is rotated using a small electrical motor 11, typically a DC motor. A motor gear 14 drives a ring gear 15, which in turn rotates the cam barrel 17. The motor 11 works in coordination with a rotary or linear encoder, which is a position sensor that converts the angular position or motion of the barrel into electrical output signals. As current is applied the barrel 17 is rotated, moving the zoom lenses along the optical axis in one direction, magnifying the objects and decreasing the field of vision, also known as zooming in. Applying current to move the zoom lenses along the optical axis in the opposite direction reduces the apparent size of the objects and increases the field of vision, also known as zooming out. If no current is applied the barrel and lenses remain still.

The length of the motor 11 should be as small as possible and yet provide sufficient torque. It should be less than the length of the loupe 10, typically 25-30 mm. And it needs to be lightweight so that it doesn't cause the surgical loupes to be too heavy for the wearer, preferably less than 6 grams. The motor 11 needs sufficient torque to turn the cam barrel 17, typically more than 2.0 mNm torque. Micromotors are available commercially. The Maxon ECX04 Brushless DC motor is 4 mm in diameter, 30 mm in length, has a 17:1 gearbox, a magnetic encoder and an accuracy of 1.4 degree. It weighs less than 6 grams and provides more than 3.5 mNm torque, which is sufficient to turn the cam barrel 17.

The encoder comprises an encoder chip 40 and an encoder strip 41, as known in the art. The encoder chip 40 contains a magnetic or optical sensor that works with the encoder strip to measure the amount of travel. The encoder chip tells the motor how far to rotate, in response to the signal sent to it from the foot pedal 30 to the electric circuit in the belt pack 22.

The amount of magnification is limited by the lenses and the distance they can travel between end stops. The loupe has at least two stops at different magnifications. In a preferred embodiment, the stops are at 3x, 4x, 5x, and 6x magnification. For binocular loupes, the loupes may move synchronously or asynchronously. Each loupe typically stops at the same magnification as that in the other loupe, but in some embodiments they loupes may stop at a different magnifications. In some embodiments the magnification is infinitely variable between end stops for each loupe.

Figure 12:
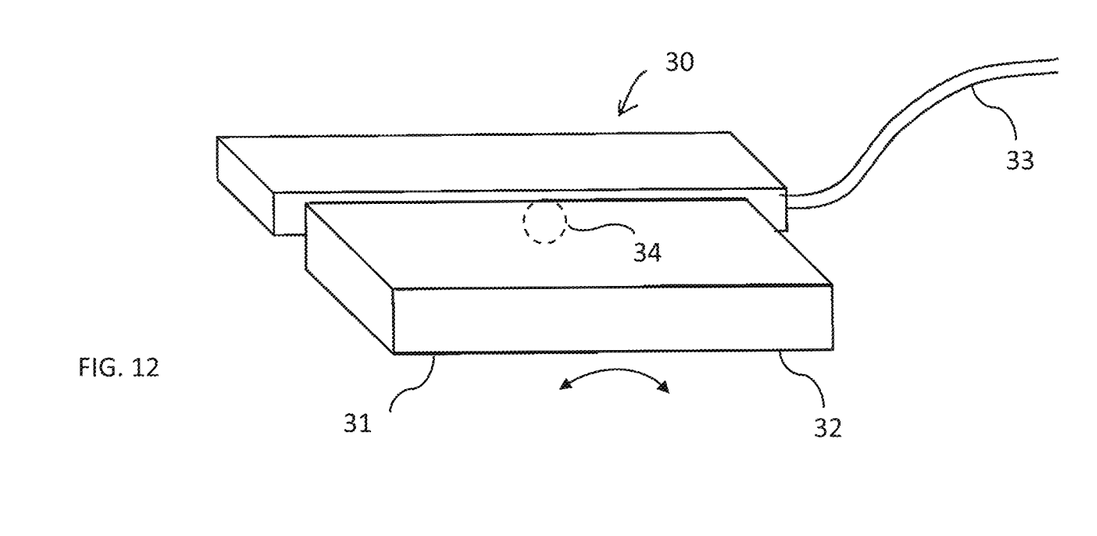
FIG. 12 is a schematic illustration of a single foot pedal in communication with the housing by a cord.
Figure 13:
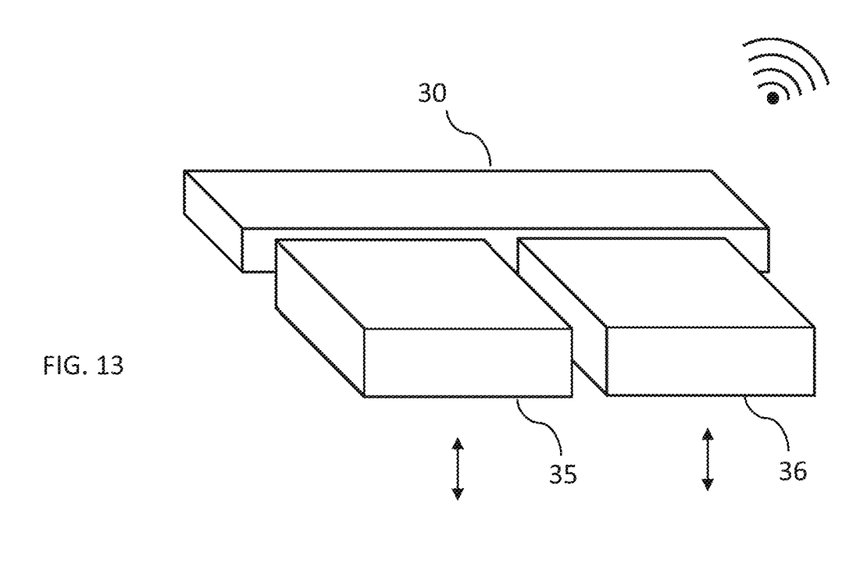
FIG. 13 is a schematic illustration of a cordless dual foot pedal in communication with the circuitry in the housing by wireless signal.

The loupes 10 are in communication with a foot pedal 30 via the belt pack 22. See FIGS. 11-14. The foot pedal can be connected by wire 33 to the belt pack 22, but instead is preferably in communication with the belt pack 22 by wireless communication, for example by Bluetooth signals. See FIG. 13. If a single foot pedal is used as shown in FIG. 12, pressing it on one side 31 sends a signal to move the barrel in one direction to zoom in, and pressing it on the other side 32 sends a signal to move the barrel in the other direction, for example in a rocking motion around a pivot point 34. In this way the user can zoom in or out using his foot as opposed to having to use his hands to touch the loupes. If a dual foot pedal is used as shown in FIG. 13, pressing one pedal 35 zooms in on the field of view and pressing the other pedal 36 zooms out.

One advantage of wireless communication between the foot pedal and the belt pack is that it gives the user freedom of movement not only within a given operatory, but between them. For example, a dentist office may have several operatories where surgery is conducted daily. By placing a foot pedal that communicates with the loupes in each operatory, the dentist may move from one operatory to the next without removing the loupes and without having to move the foot pedal from one operatory to the next.

Figure 15:
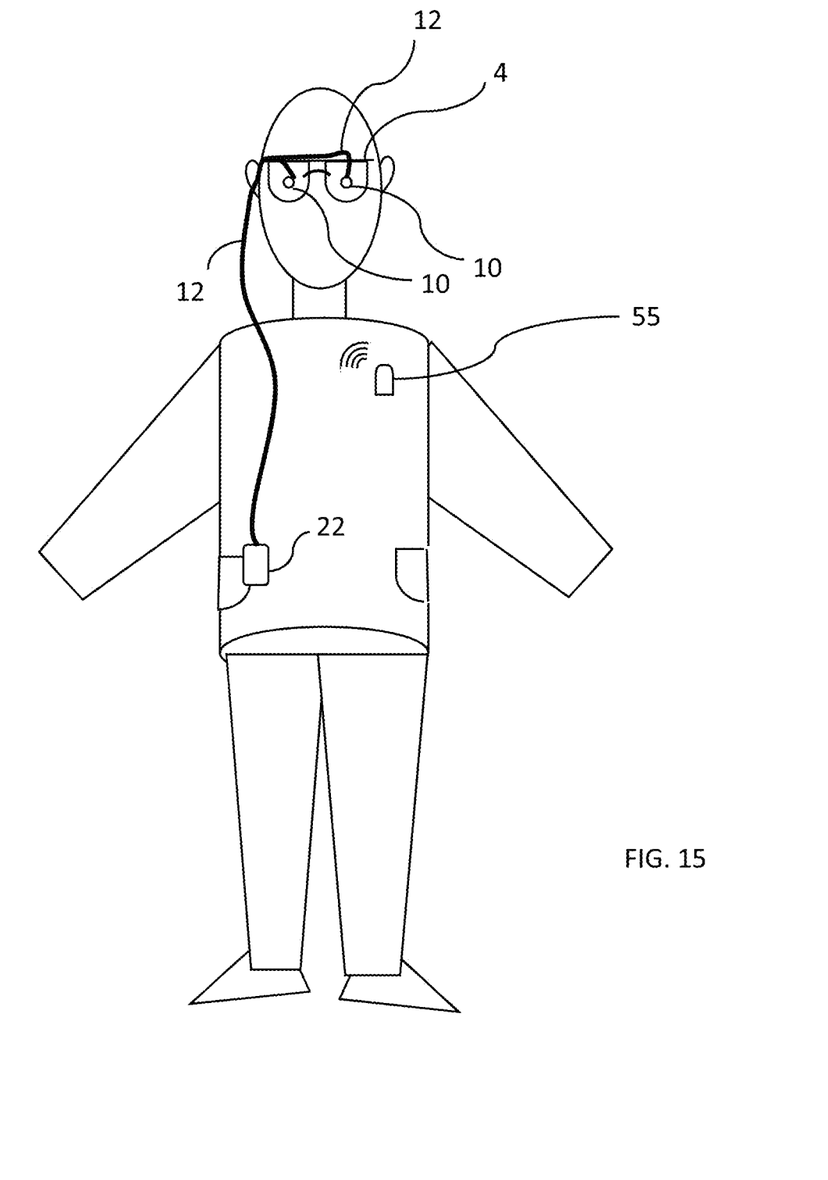
FIG. 15 illustrates a dentist wearing the device and using a microphone to signal the level of magnification desired.

In another embodiment, the zoom is controlled by voice, using wireless communications such as a Bluetooth wireless microphone 55 or with a wired microphone. The microphone may be contained in the belt pack or worn by the user. See FIG. 15.

In another embodiment, the motorized loupes are attached to a headband, visor, hat, other headpiece or other mechanism that enables the user to see through the loupes and change the magnification without touching the loupe. Alternatively, the motorized loupes may be removably attached to the wearer's eyeglasses, for example by using clips to secure the loupes to the lenses. In another embodiment, instead of a pair of loupes, a single motorized loupe can be attached to eyeglass frame, a visor, or other mechanism to enable the use to see through the loupe and change the magnification without touching the loupe.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments and equivalents falling within the scope of this description.

I claim:

1. A motorized binocular magnifying device compromising:

a) an eyeglass frame holding a first eyeglass lens and a second eyeglass lens;
b) a first loupe having a first optical axis, the first loupe integral with the first eyeglass lens and a second loupe having a second optical axis, the second loupe integral with the second eyeglass lens, wherein:
   i) the first and second optical axes are static relative to each other; and
   ii) the first loupe has a movable first zoom lens and the second loupe has a movable second zoom lens;
c) a first motor attached to the first loupe and a second motor attached to the second loupe;
d) a first encoder attached to the first loupe and in communication with the first motor and a second encoder attached to the second loupe and in communication with the second motor;
e) an RF receiver for receiving a signal to activate the first motor to move the first loupe lens to change magnification and the second motor to move the second loupe lens to change magnification; and
f) a microcontroller in communication with the RF receiver, the first motor, and the second motor.

2. The device of claim 1 further comprising a battery in communication with the first and second motors.

3. The device of claim 2 further comprising a belt pack in communication with the first and second motors, the belt pack holding the battery, RF receiver, and microcontroller.

4. The device of claim 3 further comprising a cord that connects the belt pack to the first and second motors.

5. The device of claim 1 further comprising a foot pedal in wireless communication with the RF receiver.

6. The device of claim 1 further comprising a microphone in wireless communication with the RF receiver.

7. The device of claim 1 wherein the eyeglass frame is attached to a headband, a visor, a hat or other headpiece.

8. A motorized binocular magnifying device comprising:
a) an eyeglass frame holding a first eyeglass lens and a second eyeglass lens;
b) a first loupe having a movable first zoom lens and a first optical axis, the first loupe integral with the first eyeglass lens in a through-the-lens configuration;
c) a second loupe having a movable second zoom lens a second optical axis, the second loupe integral with the second eyeglass lens in a through-the-lens configuration, wherein the first and second optical axes are static relative to each other;
d) a first motor attached to the first loupe and a second motor attached to the second loupe;
e) a first encoder attached to the first loupe and in communication with the first motor and a second encoder attached to the second loupe and in communication with the second motor;
f) an RF receiver for receiving a signal to activate the first motor to move the first loupe lens to change magnification and the second motor to move the second loupe lens to change magnification;
g) a microcontroller in communication with the RF receiver, the first motor, and the second motor;
h) a battery in communication with the first and second motors; and
i) a belt pack in communication with the first and second motors, the belt pack holding the battery, RF receiver, and microcontroller; wherein the belt pack is in communication with the first and second motors by a cord or by wireless RF communication.

9. The device of claim 8 wherein the eyeglass frame is attached to a headband, a visor, a hat or other headpiece.

10. A motorized binocular magnifying device consisting of:
a) an eyeglass frame holding a first eyeglass lens and a second eyeglass lens;
b) a first loupe having a movable first zoom lens and a first optical axis, the first loupe integral with the first eyeglass lens;
c) a second loupe having a movable second zoom lens a second optical axis, the second loupe integral with the second eyeglass lens, wherein the first and second optical axes are static relative to each other;
d) a first motor attached to the first loupe and a second motor attached to the second loupe;
e) a first encoder attached to the first loupe and in communication with the first motor and a second encoder attached to the second loupe and in communication with the second motor;
f) an RF receiver for receiving a signal to activate the first motor to move the first loupe lens to change magnification and the second motor to move the second loupe lens to change magnification;
g) a microcontroller in communication with the RF receiver, the first motor, and the second motor;
h) a battery in communication with the first and second motors; and
i) a belt pack in communication with the first and second motors, the belt pack holding the battery, RF receiver, and microcontroller; wherein the belt pack is in communication with the first and second motors by a cord or by wireless RF communication.

11. The device of claim 10 wherein the eyeglass frame is attached to a headband, a visor, a hat or other headpiece.

* * * * *

UNITED STATES PATENT AND TRADEMARK OFFICE
CERTIFICATE OF CORRECTION

| | |
|---|---|
| PATENT NO. | : 11,640,051 B1 |
| APPLICATION NO. | : 17/733052 |
| DATED | : May 2, 2023 |
| INVENTOR(S) | : Jack H Casale |

It is certified that error appears in the above-identified patent and that said Letters Patent is hereby corrected as shown below:

In the Claims

At Column 4, Lines 66-67, replace the preamble of Claim 1:
"1. A motorized binocular magnifying device compromising:"

With:
"1. A motorized binocular magnifying device comprising:"

Signed and Sealed this
Seventeenth Day of October, 2023

Katherine Kelly Vidal
*Director of the United States Patent and Trademark Office*